United States Patent
Horiuchi et al.

(10) Patent No.: US 8,554,416 B2
(45) Date of Patent: Oct. 8, 2013

(54) REAR WHEEL STEERING ANGLE CONTROLLING DEVICE FOR VEHICLES

(75) Inventors: Yutaka Horiuchi, Saitama (JP); Takashi Yanagi, Saitama (JP); Hiroaki Sasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1019 days.

(21) Appl. No.: 12/311,295

(22) PCT Filed: Oct. 19, 2007

(86) PCT No.: PCT/JP2007/001140
§ 371 (c)(1),
(2), (4) Date: Mar. 25, 2009

(87) PCT Pub. No.: WO2008/047481
PCT Pub. Date: Apr. 24, 2008

(65) Prior Publication Data
US 2010/0023217 A1    Jan. 28, 2010

(30) Foreign Application Priority Data

Oct. 20, 2006 (JP) ................................. 2006-285722

(51) Int. Cl.
*G06F 19/00* (2011.01)
*B62D 7/15* (2006.01)

(52) U.S. Cl.
CPC ...................................... *B62D 7/159* (2013.01)
USPC ............................................ 701/42; 180/445

(58) Field of Classification Search
USPC ........................................ 701/42, 77; 180/445
See application file for complete search history.

(56) References Cited

U.S. PATENT DOCUMENTS

| | | | |
|---|---|---|---|
| 4,679,808 A * | 7/1987 | Ito et al. ...................... | 180/408 |
| 4,768,603 A | 9/1988 | Sugiyama et al. | |
| 5,159,553 A * | 10/1992 | Karnopp et al. ................ | 701/41 |
| 5,208,751 A * | 5/1993 | Berkefeld ........................ | 701/41 |
| 5,227,974 A * | 7/1993 | Tomoda et al. ................. | 701/41 |

(Continued)

FOREIGN PATENT DOCUMENTS

| | | |
|---|---|---|
| JP | 62-120274 A | 6/1987 |
| JP | 1-285465 A | 11/1989 |

(Continued)

*Primary Examiner* — Anne Marie M Boehler
*Assistant Examiner* — Maurice Williams
(74) *Attorney, Agent, or Firm* — Carrier Blackman & Associates, P.C.; Joseph P. Carrier; Jeffrey T. Gedeon

(57) ABSTRACT

The present invention provides a rear wheel steering angle controlling device for vehicles comprising: a rear wheel steering mechanism (5R, 5L) for changing a rear wheel steering angle; a front wheel steering angle detector (9) for detecting a front wheel steering angle ($\delta_f$); a vehicle velocity detector (10R, 10L) for detecting a vehicle velocity (V); a feedforward rear wheel steering angle control target value setting unit (21) for setting a feedforward control target value ($\delta_r FF$) of said rear wheel steering angle according to said front wheel steering angle, said vehicle velocity, a steering yaw rate transfer function property ($G_{\gamma 0}$) of the vehicle without a rear wheel steering angle control, and a prescribed reference steering yaw rate transfer function property ($G_{ideal}$); and a controlling device (11) for controlling said rear wheel steering mechanism according to said feedforward rear wheel steering angle control target value; wherein a steady-state property of said reference steering yaw rate transfer function property is configured to be identical to said steering yaw rate transfer function property without said rear wheel steering angle control.

6 Claims, 7 Drawing Sheets

(56) References Cited

U.S. PATENT DOCUMENTS

| | | | |
|---|---|---|---|
| 5,267,160 A * | 11/1993 | Ito et al. | 701/42 |
| 5,285,390 A * | 2/1994 | Haseda et al. | 701/41 |
| 5,311,956 A * | 5/1994 | Sugiyama | 180/412 |
| 5,457,632 A * | 10/1995 | Tagawa et al. | 701/43 |
| 5,467,278 A * | 11/1995 | Sugiyama | 701/41 |
| 5,615,117 A | 3/1997 | Serizawa | |
| 5,627,754 A * | 5/1997 | Asanuma et al. | 701/41 |
| 5,684,699 A * | 11/1997 | Sugiyama | 701/41 |
| 6,397,135 B1 * | 5/2002 | Akita | 701/41 |
| 7,213,675 B2 * | 5/2007 | Martens et al. | 180/411 |
| 2002/0143451 A1 * | 10/2002 | Hac et al. | 701/48 |
| 2003/0074122 A1 * | 4/2003 | Hac | 701/70 |
| 2004/0102887 A1 * | 5/2004 | Lin et al. | 701/70 |
| 2005/0236223 A1 * | 10/2005 | Yokota | 180/446 |
| 2006/0080016 A1 * | 4/2006 | Kasahara et al. | 701/41 |

FOREIGN PATENT DOCUMENTS

| | | |
|---|---|---|
| JP | 2-11474 A | 1/1990 |
| JP | 2-018168 A | 1/1990 |
| JP | 2-241880 A | 9/1990 |
| JP | 4-365674 A | 12/1992 |
| JP | 5-139325 A | 6/1993 |
| JP | 7-156819 A | 6/1995 |
| JP | 9-30438 A | 2/1997 |
| JP | 2003-252229 A | 9/2003 |
| JP | 2006-056283 A | 3/2006 |
| JP | 2006-062505 A | 3/2006 |

* cited by examiner

REAR WHEEL STEERING ANGLE CONTROLLING DEVICE FOR VEHICLES

TECHNICAL FIELD

The present invention relates to a vehicle rear wheel steering angle controlling device for changing the rear wheel steering angle.

BACKGROUND OF THE INVENTION

There is known a rear wheel toe angle controlling device configured to change the toe angles of right and left rear wheels individually by extending and retracting linear displacement actuators such as hydraulic cylinders mounted to parts of the vehicle body where lateral links or trailing links of a suspension device supporting the right and left rear wheels are joined (see Japanese patent laid open publication (kokai) No. 09-30438). Such rear wheel toe angle controlling device can steer right and left rear wheels in a same phase relationship and control their steering angle.

Conventional rear wheel steering controllers, including the one disclosed in the above Japanese patent laid open publication, are configured to control the rear wheel steering angle according to the turning behavior of the vehicle and thus improve vehicle stability and responsiveness. In such a rear wheel steering angle control, it is a common practice to determine a control target value of the rear wheel steering angle according to the front wheel steering angle, lateral acceleration, and/or yaw rate. According to one of such known control mechanisms, the rear wheel steering angle is controlled such that the slip angle becomes 0 (See Japanese Patent No. 3,179,271). The term "slip angle" refers to the angle between the travel direction to which the vehicle body is headed and the direction in which the vehicle is actually traveling when the vehicle is cornering.

A steady-state value of a vehicle slip angle $\beta$ of a vehicle where only front wheels are steered can be obtained from the following equation:

$$\beta = \{1 - (m/L) \cdot [L_f/(L_r \cdot k_r)] \cdot V^2\}/(1 + A \cdot V^2) \cdot (\delta_f L_r/L) \quad (1)$$

wherein, m: vehicle mass, L: wheelbase, $L_f$ and $L_r$: distance from gravitational center, $\delta_f$: front wheel steering angle, A: stability factor, V: vehicle velocity, $k_r$: rear wheel cornering power.

In addition, as is obvious from FIG. 7 which shows the relation between (vehicle slip angle $\beta$/front wheel steering angle $\delta_F$) and vehicle velocity V of vehicles having understeer, neutral steer and oversteer properties, the slip angle $\beta$ has a positive value when the vehicle velocity is 0 and changes toward a negative value as the vehicle velocity increases, regardless of the steer property. This means that a vehicle turning with a low velocity tends to head outwardly from a regular turning radius, while a vehicle turning with a high velocity tends to head inwardly into a regular turning radius. As is obvious from equation (1) and FIG. 7, since the slip angle changes according to the vehicle velocity, regardless of the steer property, when the rear wheel steering angle is variably controlled such that the slip angle becomes 0 regardless of the vehicle velocity, a vehicle operator who is used to drive vehicles where only front wheels are steered will feel that the vehicle turns more than intended. In addition, when the vehicle accelerates or when there is a sudden change in road condition, the conventional rear wheel steering angle controlling mechanisms are not able to properly deal with these changes, and this may cause a discomfort to the vehicle operator.

The present invention was conceived in view of such problems of the prior art and its main object is to provide a rear wheel steering angle controlling device which can prevent the vehicle operator from experiencing a discomfort regarding the vehicle handling and improve vehicle stability and yaw responsiveness.

BRIEF SUMMARY OF THE INVENTION

According to the present invention, to solve the above-mentioned problems, there is provided a rear wheel steering angle controlling device for vehicles comprising: a rear wheel steering mechanism (5R, 5L) for changing a rear wheel steering angle; a front wheel steering angle detector (9) for detecting a front wheel steering angle ($\delta_f$); a vehicle velocity detector (10R, 10L) for detecting a vehicle velocity (V); a feedforward rear wheel steering angle control target value setting unit (21) for setting a feedforward control target value ($\delta_r$FF) of said rear wheel steering angle according to said front wheel steering angle, said vehicle velocity, a steering yaw rate transfer function property ($G_{y0}$) without a rear wheel steering angle control and a prescribed reference steering yaw rate transfer function property ($G_{ideal}$); and a controlling device (11) for controlling said rear wheel steering mechanism according to said feedforward rear wheel steering angle control target value; wherein a steady-state property of said reference steering yaw rate transfer function property is configured to be identical to said steering yaw rate transfer function property without said rear wheel steering angle control. The rear wheel steering mechanism may comprise, for example, actuators capable of controlling the toe angles of right and left rear wheels individually. In addition, the vehicle velocity detector may include vehicle wheel velocity sensors mounted to rear wheels. The vehicle velocity can also be obtained by integrating the acceleration obtained from acceleration sensors. The acceleration may also be obtained by differentiating the vehicle velocity.

According to the rear wheel steering angle controlling device for vehicles configured as above, in a transient state, vehicle responsiveness and stability can be improved by controlling the rear wheel steering angle, while in a steady state, the vehicle operator can be prevented from experiencing an unfamiliar feeling or otherwise experiencing discomfort regarding the vehicle handling by controlling the slip angle $\beta$ to be the same as it would be when the rear wheel steering angle is not controlled.

Furthermore, according to another aspect of the present invention, there is provided a rear wheel steering angle controlling device for vehicles, comprising: a rear wheel steering mechanism (5R, 5L) for changing a rear wheel steering angle; a front wheel steering angle detector (9) for detecting a front wheel steering angle ($\delta_f$); a vehicle velocity detector (10R, 10L) for detecting a vehicle velocity (V); a fore-and-aft acceleration/deceleration detector (7x) for detecting a fore-and-aft acceleration/deceleration of said vehicle; a feedforward rear wheel steering angle control target value setting unit (21) for setting a feedforward control target value of said rear wheel steering angle according to said front wheel steering angle and said vehicle velocity; and a controlling device (11) for controlling said rear wheel steering mechanism according to said feedforward rear wheel steering angle control target value; wherein said rear wheel steering angle feedforward control target value setting unit changes said feedforward rear wheel steering angle control target value according to a change in a vehicle steer property caused by said fore-and-aft acceleration/deceleration of said vehicle. This is preferably achieved, for example, by modifying a stability factor used for computing the steering yaw rate transfer function property without rear wheel steering angle control according to changes in vehicle steer property caused by acceleration/deceleration of said vehicle, when said feedforward rear wheel steering angle control target value setting unit sets said feedforward rear wheel steering angle control target value according to said front wheel steering angle, said vehicle velocity, the steering yaw rate transfer function property without rear wheel steering angle control, and the prescribed reference steering yaw rate transfer function property. Thus, changes in the steer property of the vehicle caused by its acceleration/deceleration can be addressed, thereby preventing the vehicle operator from experiencing an unfamiliar feeling regarding the vehicle handling even when the vehicle is accelerating or decelerating, and improving vehicle stability and responsiveness.

More preferably, the rear wheel steering angle controlling device for vehicles of the present invention further comprises a yaw rate detector (8) for detecting a yaw rate of said vehicle; a lateral acceleration detector (7y) for detecting a lateral acceleration of said vehicle; a target yaw rate setting unit (23) for determining a target yaw rate from said vehicle velocity and said lateral acceleration; and a feedback rear wheel steering angle control target value setting unit (24) for determining a feedback rear wheel steering angle control target value according to a difference between a yaw rate detected by said yaw rate detector and said target yaw rate; wherein said rear wheel steering mechanism is controlled according to a rear wheel steering angle control target value ($\delta_r$REF) obtained by adding said feedforward rear wheel steering angle control target value to said feedback rear wheel steering angle control target value. Therefore, even when the lateral acceleration changes as a result of changes in road condition, the feedback rear wheel steering angle control target value can be determined based on the target yaw rate, which has been set according to changes in the lateral acceleration. Thus, the controlling device can be configured to have a highly robust stability and to be stable against changes in road condition. A transfer function (Ga) which defines the relation between the velocity, lateral acceleration, and target yaw rate is preferred to reflect the feedforward rear wheel steering angle control.

According to the present invention, in a transient state, vehicle stability and responsiveness can be improved by controlling the rear wheel steering angle, while in a steady state, the slip angle β can be controlled to be the same as it would be when the rear wheel steering angle is not controlled, and thus the vehicle operator can be prevented from experiencing an unfamiliar feeling regarding the vehicle handling. In addition, when the vehicle is turning with acceleration/deceleration, changes in the vehicle turning property caused by a fore-and-aft shifting of the vehicle load can be addressed automatically, thereby preventing the vehicle operator from experiencing an unfamiliar feeling regarding the vehicle handling and improving vehicle stability and responsiveness even when the vehicle is turning with acceleration/deceleration. Furthermore, the controlling device can be configured to be able to perform control actions appropriately according to changes in road condition.

DETAILED DESCRIPTION OF THE PREFERRED EMBODIMENTS

The present invention is described below in detail with reference to accompanying drawings.

Figure 1:
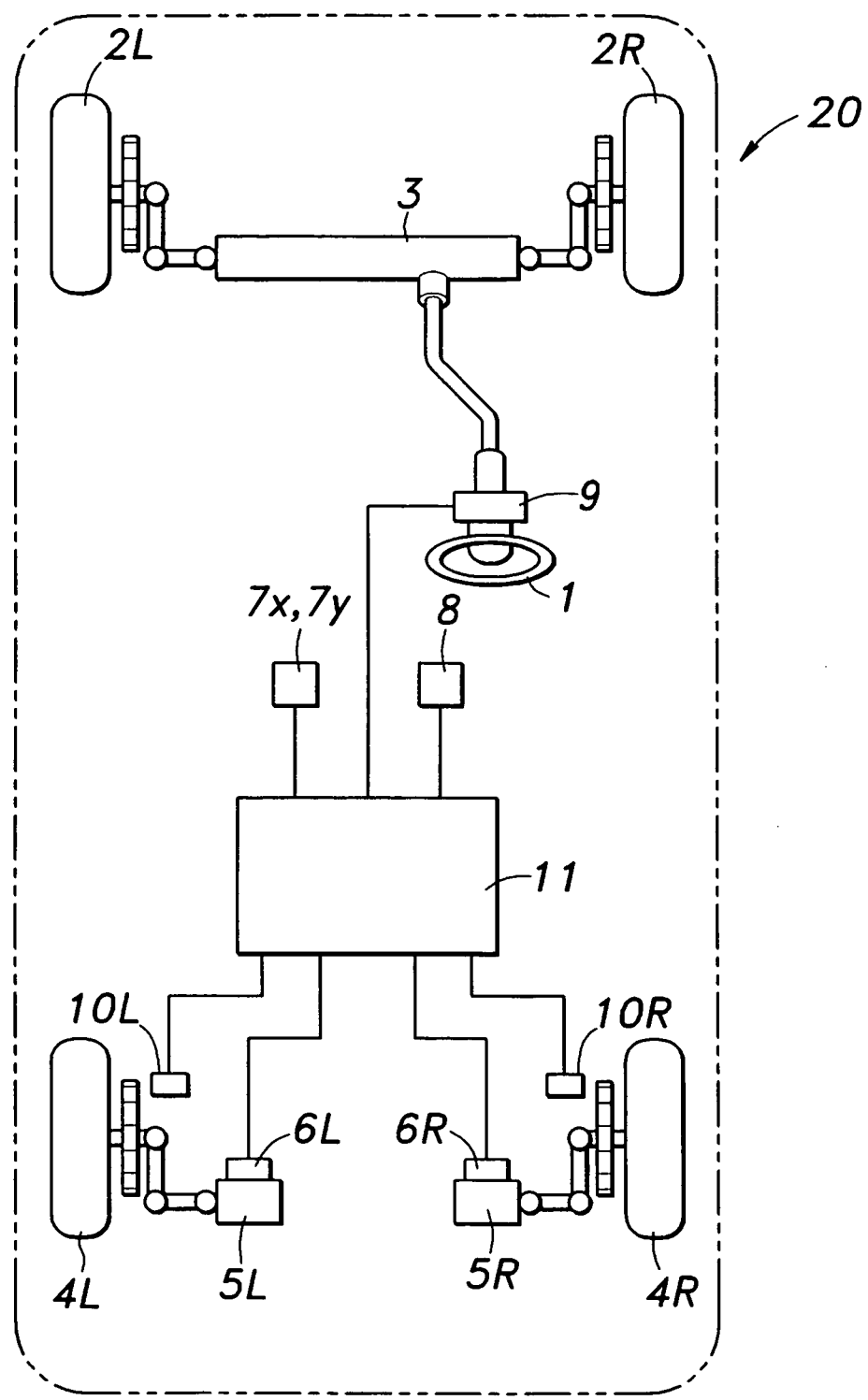
FIG. 1 is a schematic configuration diagram of a vehicle to which the present invention is applied.

FIG. 1 shows an outline of a vehicle with the present invention applied thereto. This vehicle 20 comprises a front wheel steering device 3 for directly steering right and left front wheels 2R and 2L according to the steering of a steering wheel 1, right and left actuators 5R and 5L for individually changing toe angles of right and left rear wheels 4R and 4L by changing the length of, for example, right and left lateral links of a rear wheel suspension device which supports the right and left rear wheels 4R and 4L, right and left toe angle sensors 6R and 6L for individually detecting the toe angles of the right and left rear wheels 4R and 4L from the displacement amount of the right and left actuators 5R and 5L, a fore-and-aft acceleration sensor 7x for detecting a fore-and-aft acceleration acting on the vehicle body, a lateral acceleration sensor 7y for detecting a lateral acceleration, a yaw rate sensor 8 for detecting a yaw rate of the vehicle body, a steering angle sensor 9 for detecting a steering angle of the steering wheel 1, wheel velocity sensors 10R and 10L mounted to the rear wheels 4R and 4L, which are non-driven wheels, and a control unit 11 for controlling the displacement of each of the actuators 5R and 5L according to the output of the corresponding sensor.

For the actuators 5R and 5L, a rotary/linear motion converter combining an electric motor having a reduction gear and a screw mechanism, a cylinder device that linearly actuates a piston rod with hydraulic pressure, or any other known linear displacement actuator can be used.

According to the toe angle variable control system configured as above, the toe-in and toe-out of the rear wheels 4R and 4L can be freely controlled as required by simultaneously actuating the right and left actuators 5R and 5L in a symmetric manner. Furthermore, by extending one of the right and left actuators 5R and 5L and retracting the other one, both of the rear wheels 4R and 4L can be steered either to the right or to the left.

Figure 2:
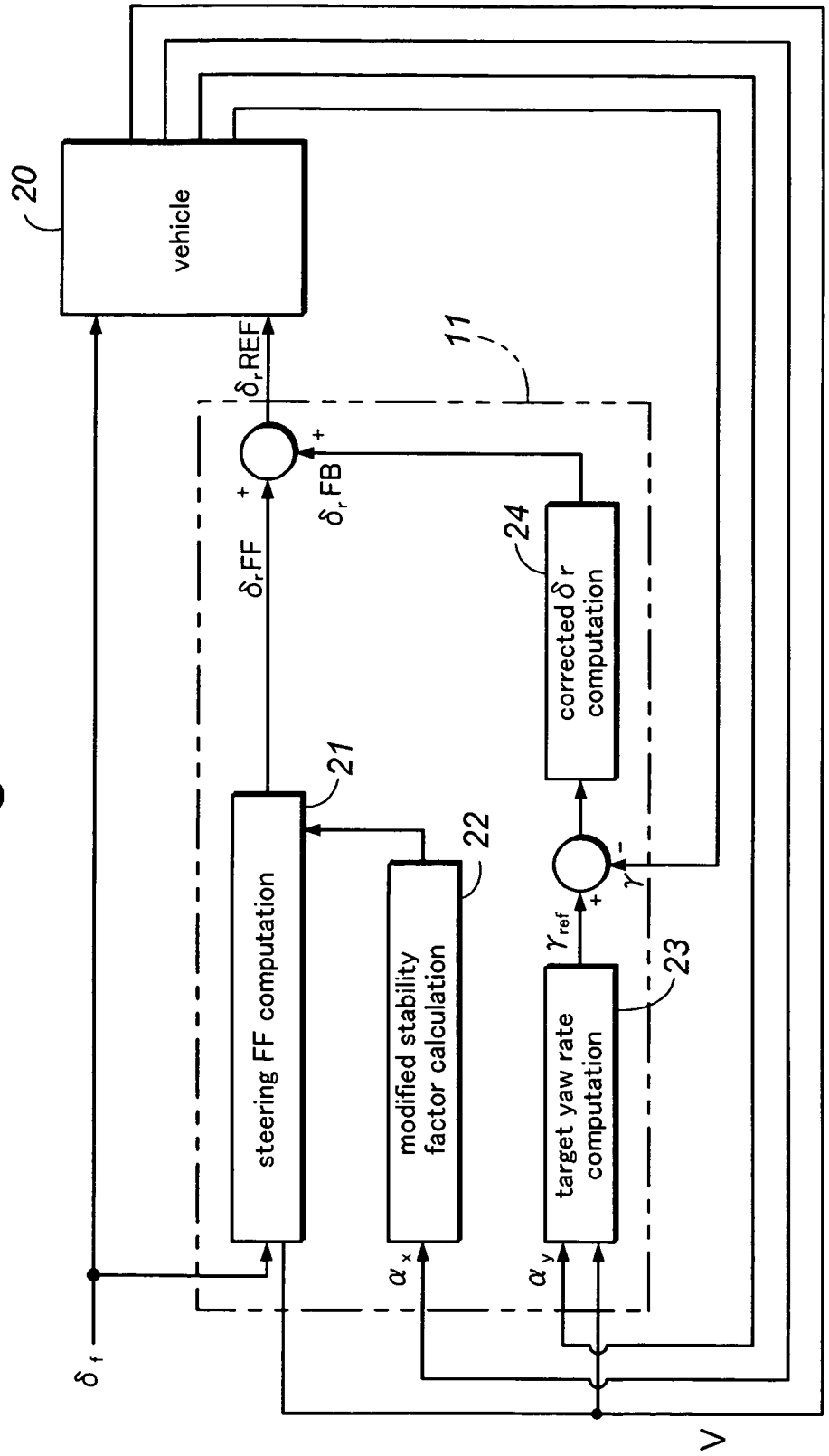
FIG. 2 is a schematic block diagram of the control of the present invention.

FIG. 2 shows a control block diagram showing the configuration of the control unit 11. The control unit 11 may comprise a microcomputer. A steering amount $\delta_f$ of the front wheels 2R and 2L is detected by the steering angle sensor 9 and is inputted into a feedforward computing unit 21. In addition, an output $\alpha_x$ of the fore-and-aft acceleration sensor 7x mounted to the vehicle body, is inputted into modified stability factor calculating unit 22. Then, a modified stability factor A calculated from the fore-and-aft acceleration $\alpha_x$ is inputted into the feedforward computing unit 21. A velocity V obtained by computing the average value of the outputs from the wheel velocity sensors 10R and 10L of the rear wheels 4R and 4L is inputted into the feedforward computing unit 21. The feedforward computing unit 21, then, computes and outputs a feedforward control target value $\delta_r$FF for the rear wheel steering angle (toe angle) from the inputted front wheel steering angle $\delta_f$, modified stability factor A, vehicle velocity V and so on, as will be described later in detail.

In addition, an output $\alpha_y$ from the lateral acceleration sensor $7y$ mounted to the vehicle body and the above vehicle velocity V are inputted into a target yaw rate computing unit 23, and based on these inputted data, a target yaw rate $\gamma_{ref}$ is computed and outputted.

Then, the deviation between an output $\gamma$ from the yaw rate sensor 8 mounted to the vehicle body and the output $\gamma_{ref}$ from the target yaw rate computing unit 23 is calculated. A rear wheel steering angle (toe angle) computing unit 24 computes a corrected rear wheel steering angle that minimizes this deviation, and outputs it as a feedback control target value $\delta_r$FB for the rear wheel steering angle.

Then, the feedforward control target value $\delta_r$FF is added to the feedback control target value $\delta_r$FB to obtain a rear wheel steering angle (toe angle) control target value $\delta_r$REF, which is then provided to the actuators 5R and 5L. The control unit 11 actuates the actuators 5R and 5L such that the rear wheel steering angle $\delta_r$ becomes equal to the rear wheel steering angle control target value $\delta_r$REF.

Figure 3:
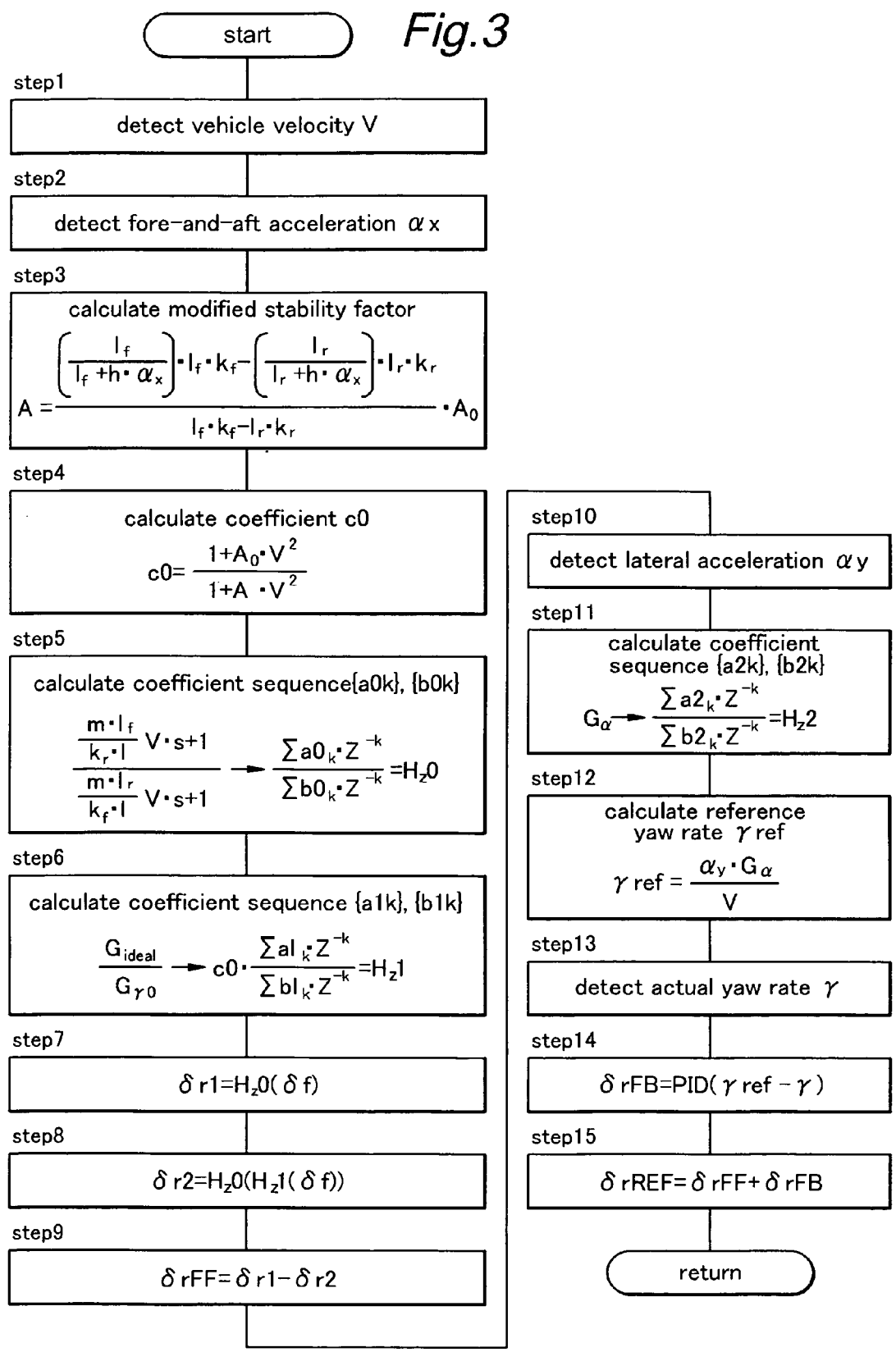
FIG. 3 is a schematic flow diagram of the control of the present invention.

Next, the control procedure of the present invention, performed by the control unit 11 configured as above, is described with reference to FIG. 3.

First, in step 1, the vehicle velocity V is obtained by computing the average value of the outputs from the wheel velocity sensors 10R and 10L of the rear wheels 4R and 4L.

Next, in step 2, the fore-and-aft acceleration $\alpha_x$ is obtained from the output of the fore-and-aft acceleration sensor $7x$. This value, in addition to being directly obtained from the acceleration sensor, may also be obtained by other means such as estimating it from the differential value of the vehicle velocity.

Next, in step 3, the modified stability factor value A is calculated (see the equation (8) shown below). In step 4, a ratio c0 of the steady-state gain of the steering yaw rate transfer function property of the base vehicle (with acceleration/deceleration) to that of the ideal vehicle (without acceleration/deceleration) is obtained from the modified stability factor value A, steady-state stability factor $A_0$, and vehicle velocity V obtained in Step 1. This value is a variable that varies depending on the vehicle velocity and fore-and-aft acceleration and can be obtained from a prescribed map or the like.

Next, in step 5, a sequence of coefficients ($a0_k$, $b0_k$) for digitally-representing the first half of an equation (or a transfer function property for the rear wheel steering angle $\delta_r$ to an input of the front wheel steering angle $\delta_f$ as given in Equation (3) below) which determines the rear wheel steering angle $\delta_r$ in relation to the front wheel steering angle $\delta_f$ so as to achieve a required steering yaw rate transfer function property (the reference steering yaw rate transfer function property) $G_{ideal}$ are computed. The transfer function on the left hand side in the block for step 5 is a phase-lead/lag property which depends on the vehicle velocity, and $a0_k$ and $b0_k$ are coefficients of a difference equation obtained by digitally-representing this transfer function. The digital representation of the transfer function is expressed as Hz0.

Next, in step 6, a sequence of coefficients ($a1_k$, $b1_k$) for digitally-representing the second half of the equation (3) is calculated. $G_{\gamma 0}$ is the steering yaw rate transfer function property when the rear wheel steering angle is 0 (i.e., is not controlled). Since $G_{\gamma 0}$ and $G_{ideal}$ are transfer functions which depend on the vehicle velocity, and as each of them is in the form of (first order function/second order function), $G_{ideal}/G_{\gamma 0}$ is given in the form of (third order function/third order function). $a1_k$, $b1_k$ are coefficients of a difference equation obtained when this function is converted into a discrete function and digitally-represented. The digital representation of this transfer function is expressed as Hz1.

The steady-state gain of $G_{ideal}/G_{\gamma 0}$ is a function of acceleration as described below, and corresponds to the value c0 obtained in step 4.

Next, in step 7, the front wheel steering angle $\delta_f$ is inputted into the discrete transfer function Hz0 obtained in step 5, and the first half $\delta_r1$ of the equation (3) described below is calculated. In step 8, the second half $\delta_r2$ of the equation (3) is calculated from Hz0 and Hz1.

Next, in step 9, the rear wheel steering angle $\delta_r$, which is the final result of the equation (3), is calculated based on the values obtained in step 7 and step 8, and stored as the feedforward rear wheel steering angle control target value $\delta_r$FF.

From step 10 to step 14, the feedback rear wheel steering angle control target value $\delta_r$FB is calculated. First, in step 10, the output $\alpha_y$ from the lateral acceleration sensor $7y$ is obtained. In step 11, a sequence of coefficients ($a2_k$, $b2_k$) for digitally-representing the transfer function property $G_\alpha$ (see equation (13) below) of the lateral acceleration $\alpha_y$ and yaw rate $\gamma$ is calculated. This difference equation depends on the vehicle velocity which was obtained in step 1. Next, in step 12, the transfer function property $G_\alpha$ obtained in step 11 is multiplied by the lateral acceleration $\alpha_y$ obtained in step 10. Then, the resulting value is divided by the vehicle velocity V to generate the target yaw rate $\gamma_{ref}$ which is the reference value of the feedback control (see equation (14) below). When the vehicle velocity V is 0 or quite low, the division in the equation (14) becomes impossible. It is therefore necessary to make sure that division by zero does not occur in this computation.

Next, in step 13, the actual yaw rate value is obtained from the output of yaw rate sensor 8. Then, in step 14, the feedback control target value $\delta_r$FB of the rear wheel steering angle is calculated such that the actual yaw rate obtained in step 13 closely tracks the target yaw rate $\gamma_{ref}$ calculated in step 12. In this embodiment, a PID controller was used for adjustment. Also, a yaw moment that is expected to be generated by the rear wheel steering angle may be calculated.

In step 15, the feedforward control target value $\delta_r$FF of the rear wheel steering angle, which was obtained in step 9, is added to the feedback control target value $\delta_r$FB of the rear wheel steering angle, which was obtained in step 14, to determine the control target value $\delta_r$ of the rear wheel steering angle.

Next, each part of the control of the present invention is described in detail.

When the rear wheel steering angle $\delta_r$ for a given input of the front wheel actual steering angle $\delta_f$ is represented by a certain transfer function ($\delta_r/\delta_f$), the steering yaw rate transfer function property ($G_\gamma = \gamma/\delta_f$), which is a transfer function property of the yaw rate y in relation to the front wheel actual steering angle $\delta_f$ can be expressed as given in the following equation by using $G_{\gamma 0}$, which is the steering yaw rate transfer function property when the rear wheel steering angle is 0 (i.e., when the rear wheel steering angle is not controlled):

$$G_\gamma = \{1 - [V \cdot s \cdot m \cdot L_r/(k_f L) + 1]/[V \cdot s \cdot m \cdot L_f/(k_r L) + 1] \cdot (\delta_r/\delta_f)\} \cdot G_{\gamma 0} \qquad (2)$$

wherein, $\gamma$: yaw rate, s: Laplace operator, and $k_f$: front wheel cornering power.

By calculating back the equation (2), it will be obvious that in order to make the actual steering yaw rate transfer function property $G_\gamma$ be identical to the required reference steering yaw rate transfer function property $G_{ideal}$, the relation (transfer function) between the rear wheel steering angle $\delta_r$ and the front wheel steering angle $\delta_f$ may be as follows.

$$\delta_r = [V \cdot s \cdot m \cdot L_r/(k_f L) + 1]/[V \cdot s \cdot m \cdot L_f/(k_r L) + 1] \cdot (1 - G_{ideal}/G_{\gamma 0}) \cdot \delta_f \qquad (3)$$

Therefore, by measuring the steering yaw rate function property $G_{\gamma0}$ without rear wheel steering angle control, the desired reference steering yaw rate transfer function property $G_{ideal}$ can be readily obtained by controlling the transfer function property of the feedforward rear wheel steering angle control target value $\delta_r FF$ in relation to the front wheel actual steering angle $\delta_f (\delta_r/\delta_f)$. The rear wheel steering angle $\delta_r$ obtained from equation (3) is used as the feedforward rear wheel steering angle control target value $\delta_r FF$.

When the rear wheel steering angle $\delta_r$ for a given input of the front wheel actual steering angle $\delta_f$ is represented by a certain transfer function $(\delta_r/\delta_f)$ as in equation (2), the transfer function property $G_\beta$ of the vehicle slip angle $\beta$ in relation to the front wheel steering angle $\delta_f$ can be expressed as follows:

$$G_\beta = G_{\beta0} \cdot \{1 + [V \cdot s \cdot I/(k_f L) + L_f + V^2 \cdot m \cdot L_r/(k_f L)]/[V \cdot s \cdot I/(k_r \cdot L) + L_r + V^2 \cdot m \cdot L_f/(k_r \cdot L)] \cdot (\delta_r/\delta_f)\} \quad (4)$$

wherein, I: yaw moment of inertia, $G_{\beta0}$: transfer function property of the vehicle slip angle $\beta$ in relation to the front wheel steering angle $\delta_f$ when the rear wheel steering angle is not controlled.

Thus, the steering yaw rate $\gamma$ and the slip angle $\beta$ cannot be arbitrarily determined. However, if it is supposed that the steady-state value of the steering yaw rate becomes the same as the steering yaw rate without rear wheel steering angle control (i.e., when steady-state $G_{ideal} = G_{\gamma o}$) because the rear wheel steering angle $\delta_r$ in a steady-state (or feedforward rear wheel steering angle control target value $\delta_r FF$) becomes 0 according to equation (3), equation (4) gives the steady-state slip angle transfer function property or yields $G_\beta = G_{\beta0}$. This means that by adjusting the steady-state property of the reference steering yaw rate transfer function property $G_{ideal}$ such that it becomes the same as the steering yaw rate transfer function property without rear wheel steering angle control, the steady-state property of the slip angle $\beta$ becomes the same as it would be when the rear wheel steering angle is not controlled, and thus the unfamiliar feeling that the vehicle operator may experience regarding the vehicle handling can be reduced or prevented.

In a transient state, even when $G_{ideal} \neq G_{\gamma o}$, by performing feedforward control to achieve the rear wheel steering angle $\delta_r$ obtained from equation (3) (i.e., by using the rear wheel steering angle $\delta_r$ obtained in equation (3) as the feedforward rear wheel steering angle control target value $\delta_r FF$), the actual yaw rate response can be adjusted to become identical to $G_{ideal}$, thereby improving vehicle stability and responsiveness.

Figure 4:
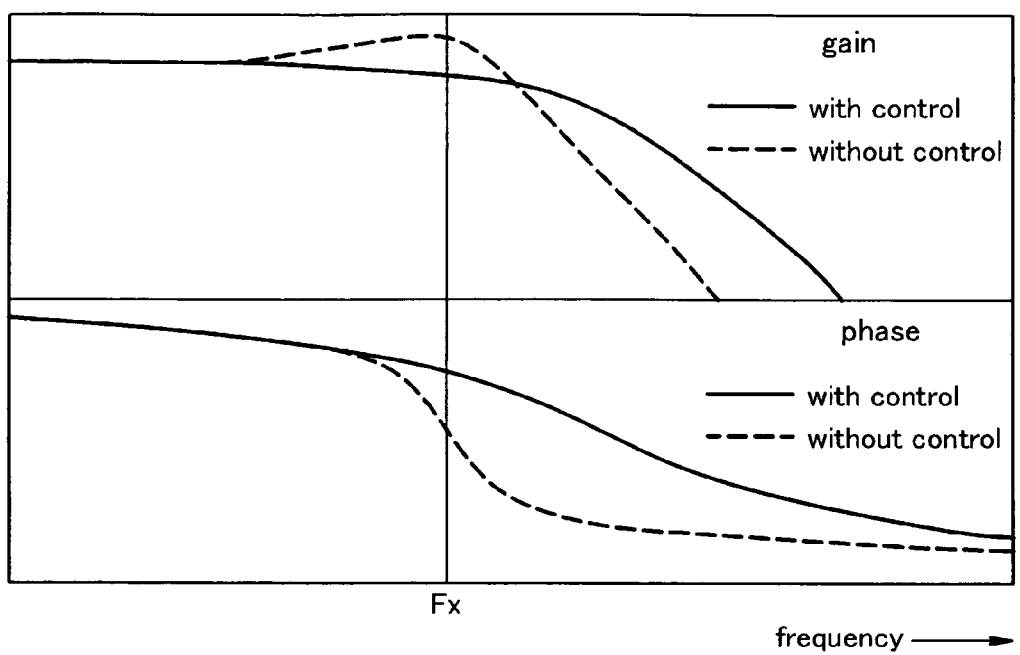
FIG. 4 is a bode chart of the transfer function property of steering yaw rate.

FIG. 4 shows a bode chart of steering yaw rate responses in presence and absence of rear wheel steering angle control, according to the present invention. As described above, the steady-state yaw rate gain is the same regardless of the presence of the control, however a pronounced resonance occurs in absence of the control at a certain frequency Fx, but no resonance is detected in presence of the control.

Also, in absence of the control, the phase significantly changes near this yaw resonance so that there is a high likelihood that the vehicle may become unstable for a given input by a vehicle operator. On the other hand, in presence of the control, since there is no yaw resonance, the phase delay is small so that the vehicle is kept stable, and it is easier for the vehicle operator to handle the vehicle.

Figure 5:
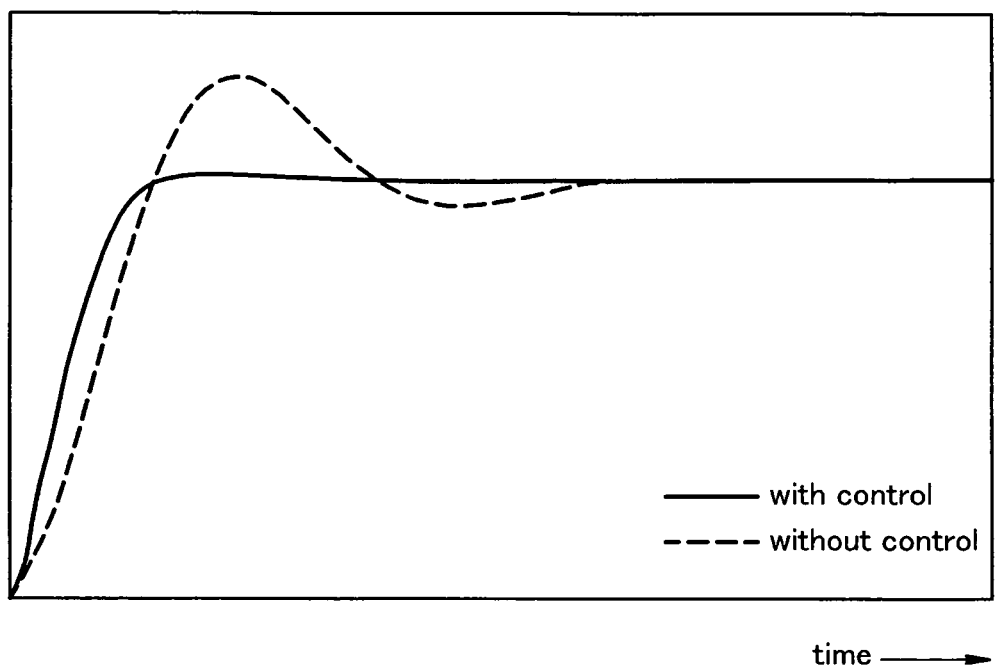
FIG. 5 is a graph showing a yaw rate response to a step steering input.

FIG. 5 shows yaw responses to a step steering input in presence and absence of rear wheel steering angle control according to the present invention.

As also evidenced by the bode diagram in FIG. 4 showing frequency properties, in presence of the control, the yaw rate in relation to steering input shows a high response without oscillation. In other words, in presence of the control, even if the yaw rate steady-state value is the same as that in absence of the control, the response is faster.

Next is described the control action of the present invention when the vehicle is accelerating/decelerating while turning.

When the rear wheel steering angle is not controlled, the yaw rate transfer function property $G_{\gamma o}$ in relation to the front wheel steering angle can be expressed as follows:

$$G_{\gamma o} = \{n_1 \cdot s + (V/L) \cdot [1/(1 + A \cdot V^2)]\}/(d_2 \cdot s^2 + d_1 \cdot s + 1) \quad (5)$$

wherein, $d_1$, $d_2$, and $n_1$ are values determined by the properties of the vehicle.

The zero-order term of equation (5) $((V/L) \cdot [1/(1+A \cdot V^2)])$ is a yaw rate steady-state gain, and A is a stability factor which can be expressed as follows:

$$A = -(m/L^2) \cdot (L_f k_f - L_r k_r)/k_f k_r \quad (6)$$

wherein, $k_f$ and $k_r$ are cornering powers of the front and rear wheels.

In a linear region, when the vehicle is turning at a constant velocity, the front and rear wheel cornering powers $k_f$ and $k_r$ are constants $k_{f0}$ and $k_{r0}$, and the stability factor A is a constant $A_0$. When the rear wheel steering angle is not controlled, the yaw rate transfer function property $G_{\gamma o}$ in relation to the front wheel steering angle can be expressed with the constant $A_0$ as the following equation (5').

$$G_{\gamma 0} = \{n_1 \cdot s + (V/L) \cdot [1/(1 + A_0 \cdot V^2)]\}/(d_2 \cdot s^2 + d_1 \cdot s + 1) \quad (5')$$

The stability factor $A_0$ at a constant velocity and steering yaw rate transfer function property $G_{\gamma o}$ (based on the stability factor $A_0$) without rear wheel steering angle control can be obtained experimentally, for example, by driving the vehicle in slalom at a constant velocity and measuring data. Therefore, the rear wheel steering angle $\delta_r$ (feedforward control target value $\delta_r FF$) for achieving the reference steering yaw rate transfer function property $G_{ideal}$ may be obtained by using the transfer function property $G_{\gamma o}$ obtained from equation (5') in equation (3).

However, if the rear wheel steering angle is controlled by using the steering yaw rate transfer function property $G_{\gamma o}$ without the control, which can be obtained from the stability factor $A_0$ at a constant velocity, when the vehicle is braked or accelerated during steering, it may be impossible to achieve a desired vehicle behavior. This is due to changes in vehicle turning properties, which are caused by the alteration of the stability factor A during acceleration or deceleration. Thus, when there is a fore-and-aft vehicle load shift of $h \cdot m \cdot \alpha_x/L$, the cornering powers of front and rear wheels ($k_f$ and $k_r$) change according to the following equation:

$$k_f = k_f 0 \cdot (L_r - h \cdot \alpha_x)/L_r, k_r = k_r 0 \cdot (L_f + h \cdot \alpha_x)/L_f \quad (7)$$

wherein, $\alpha_x$: fore-and-aft acceleration, h: height of the gravitational center, $k_f 0$: front wheel cornering power when the vehicle is turning at a constant velocity, $k_r 0$: rear wheel cornering power when the vehicle is turning at a constant velocity.

From equation (7), the stability factor A in presence of acceleration/deceleration can be expressed with the fore-and-aft acceleration $\alpha_x$, stability factor $A_0$ without acceleration/deceleration, and cornering powers $k_f 0$ and $k_r 0$ generated when the vehicle is turning at a constant velocity as the following equation.

$$A = A_0 \cdot \{[L_f/(L_f + h \cdot \alpha_x)] \cdot L_f k_f 0 - [L_r/(L_r - h \cdot \alpha_x)] \cdot L_r \cdot k_r 0\}/(L_f k_f 0 - L_r \cdot k_r 0) \quad (8)$$

Figure 6:
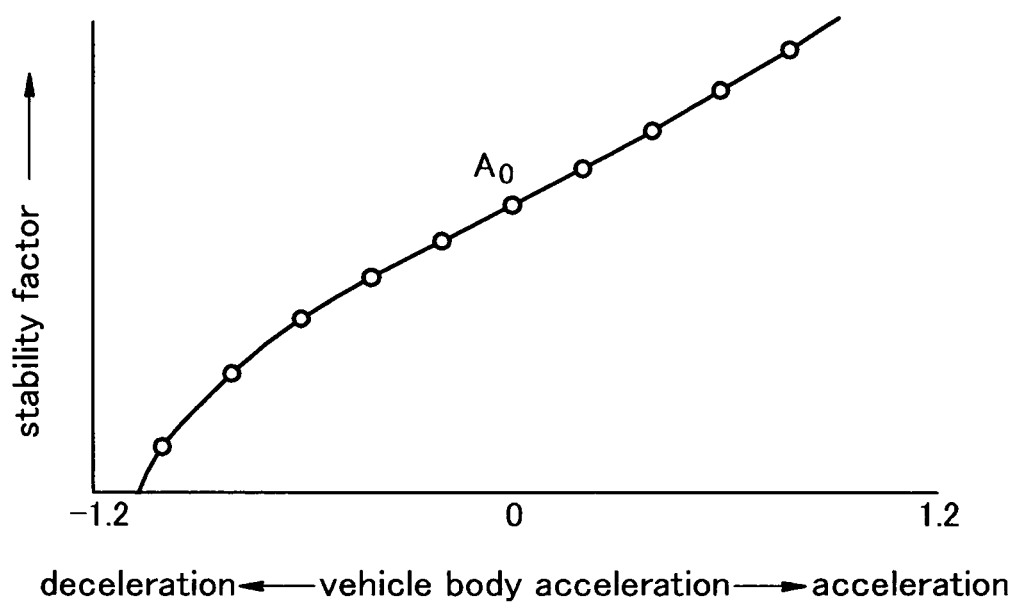
FIG. 6 is a graph showing changes of stability factor with acceleration/deceleration.
Figure 7:
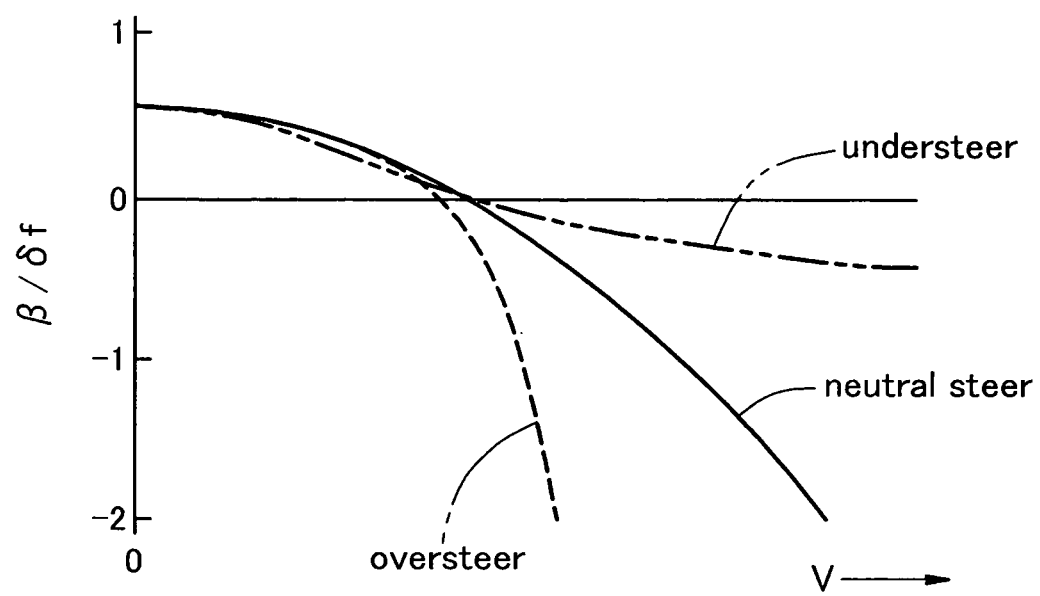
FIG. 7 is a graph showing the relation between (vehicle slip angle/steering angle) and vehicle velocity.

FIG. 6 shows the graph of equation (8). As shown in the figure, when a vehicle without rear wheel steering angle control accelerates while turning, it understeers. On the other hand, when it decelerates while turning, it oversteers.

According to the present invention, to appropriately set the feedforward rear wheel steering angle control target value $\delta_r$FF according to changes in steer property, which occur with acceleration/deceleration, the stability factor A given by equation (8) is used as the modified stability factor (i.e., both of equation (5) and equation (8) are used) instead of the stability factor $A_0$ (which was used in equation (5') to determine $G_{\gamma 0}$ used in equation (3)). Therefore, the rear wheel steering angle is controlled by the feedforward rear wheel steering angle control target value $\delta_r$FF that matches the actual stability factor, which changes according to the vehicle fore-and-aft acceleration/deceleration, thereby preventing the vehicle operator from experiencing an unfamiliar feeling regarding the vehicle handling and improving vehicle stability and responsiveness.

As described above, one of the factors that could disturb vehicle motion stability is the acceleration/deceleration during a turn. This is because, as is obvious from equation (8), when the vehicle accelerates/decelerates during a turn, the fore-and-aft load distribution changes, and thus the vehicle turning property changes. However, according to the present invention, as the feedforward control target value of the rear wheel steering angle is adjusted automatically according to changes in turning property, the vehicle behavior maintains stability even when the vehicle is accelerating/decelerating during a turn. Therefore, according to the present invention, even when the vehicle is accelerating/decelerating, the vehicle operator can be prevented from experiencing an unfamiliar feeling regarding the vehicle handling, and vehicle responsiveness and stability can be improved.

Next is described a method for controlling with high precision even when various properties of the vehicle change. By using this method, the adaptability of the vehicle, especially to the cornering power, which may change dramatically depending on the road friction coefficient, is improved.

The motion equations of the lateral acceleration $\alpha_y$ and yaw rate $\gamma$ can be expressed as follows:

$$m\alpha_y = -(k_f \beta_f) - (k_r \beta_r) \quad (9)$$

$$I \cdot d\gamma/dt = -L_f(k_f \beta_f) + L_r(k_r \beta_r) \quad (10)$$

wherein, $\beta_f, \beta_r$: slip angles of front and rear wheels, I: vehicle yaw moment of inertia, m: vehicle mass.

These equations (9) and (10) show that if the cornering powers $k_f$ and $k_r$ change significantly as a result of a change in road condition, while the yaw rate $\gamma$ will not change significantly as being the difference between the moments that act upon the front and rear parts of the vehicle, the lateral acceleration $\alpha_y$ will change significantly since it is determined by the sum of the lateral forces that act upon the front and rear parts of the vehicle.

These equations, on the other hand, show that if the road friction coefficient $\mu$ has decreased due to road condition such as snow cover, the yaw rate $\gamma$ can be changed by changing the rear wheel toe angle (i.e., rear wheel slip angle $\beta_r$), while the lateral acceleration $\alpha_y$ cannot be changed significantly.

When the slip is small, the time rate change of the vehicle slip angle $\beta(d\beta/dt)$ can be expressed by the lateral acceleration $\alpha_y$, vehicle velocity V, and yaw rate $\gamma$, as the following equation.

$$d\beta/dt = \alpha_y/V - \gamma \quad (11)$$

When the vehicle slip angle converges or settles to a steady-state value, the steady-state value of the time rate change of the vehicle slip angle becomes 0, and thus the steady-state value of the target yaw rate ($\gamma_g$) set to match the road friction coefficient $\mu$ will be as follows.

$$\gamma_g = \alpha_y/V \quad (12)$$

Therefore, since the lateral acceleration cannot be increased at the same time as increasing the yaw rate by changing the rear wheel toe angle as described above, the steering reference yaw rate must be controlled so as not to surpass the yaw rate obtained from equation (12).

When a vehicle with a road friction coefficient $\mu$ (normally, high) is controlled by using the feedforward rear wheel steering angle control target value $\delta_r$FF obtained from equation (3), the relation between the lateral acceleration $\alpha_y$ and yaw rate $\gamma(G_\alpha)$ can be expressed as the following equation.

$$G_\alpha = \gamma V/\alpha_y \quad (13)$$

Therefore, the steady-state yaw rate will be a value obtained from the following equation regardless of road condition, and thus the target yaw rate $\gamma_{ref}$ can be calculated as a reference value (from equation (11), the steady-state gain of $G_\alpha$ becomes 1).

$$\gamma_{ref} = G_\alpha \alpha_y/V \quad (14)$$

The rear wheel steering angle is feedback-controlled (i.e., the feedback rear wheel steering angle target value $\delta_r$FB is adjusted) such that the actual yaw rate $\gamma$ becomes identical to this target yaw rate $\gamma_{ref}$ calculated from the vehicle velocity V and the actual lateral acceleration $\alpha_y$. In the present invention, by performing such feedback control on the rear wheel steering angle in addition to the feedforward-control, which is performed to achieve the reference steering yaw rate property $G_{ideal}$ based on equation (3), even when the road friction coefficient $\mu$ and other parameters change, the lateral acceleration $\alpha_y$ changes only in a corresponding manner, and $\gamma_{ref}$ changes as a result thereof so that a yaw rate inappropriate for the road condition will not be generated. In addition, not only the effects of the road friction coefficient $\mu$ but also those of changes in various properties of the vehicle including vehicle mass change (caused, for example, by the number of vehicle occupants) will be reduced.

As described hereinabove, according to the rear wheel steering angle controlling device for vehicles of the present invention, as the steady-state property of the reference steering yaw rate transfer function property, which is used to determine the rear wheel steering angle feedforward control target value from the front wheel steering angle, is regulated so as to become identical to the steering yaw rate transfer function property without rear wheel steering angle control, in a transition state, vehicle responsiveness and stability can be improved by controlling the rear wheel steering angle. Meanwhile, in a steady state, the slip angle $\beta$ is controlled to be the same as it would be when the rear wheel steering angle is not controlled, thereby preventing the vehicle operator from experiencing an unfamiliar feeling regarding the vehicle handling. In addition, the feedforward target rear wheel steering angle is set according to changes in vehicle steer property caused by fore-and-aft acceleration, thereby preventing the vehicle operator from experiencing an unfamiliar feeling regarding the vehicle handling and improving vehicle stability and responsiveness even when the vehicle is accelerating or decelerating. Furthermore, because the target yaw rate is set according to changes in road condition, and the feedback rear wheel steering angle control target value is determined accordingly, the controlling device can be configured to be stable against changes in road condition and show a highly robust stability. Therefore, the rear wheel steering angle controlling device for vehicles of the present invention is extremely useful in industry.

Although the invention has been described with reference to preferred embodiments, those skilled in the art will easily understand that various modifications and changes can be made without departing from the scope of the present invention.

It should be noted that the disclosure of the basic application of the present application from which the Paris Convention Priority is claimed and all prior art mentioned in this specification are incorporated herein by reference.

The invention claimed is:

1. A rear wheel steering angle controlling device for vehicles, comprising:
    a rear wheel steering mechanism for changing a rear wheel steering angle;
    a front wheel steering angle detector for detecting a front wheel steering angle;
    a vehicle velocity detector for detecting a vehicle velocity;
    a feedforward rear wheel steering angle control target value setting unit for setting a feedforward control target value of said rear wheel steering angle according to said front wheel steering angle, said vehicle velocity, a steering yaw rate transfer function property without a rear wheel steering angle control and a prescribed reference steering yaw rate transfer function property; and
    a controlling device for controlling said rear wheel steering mechanism according to said feedforward rear wheel steering angle control target value;
    wherein said reference steering yaw rate transfer function property when the vehicle is traveling at a constant velocity is configured to be identical to said steering yaw rate transfer function property without said rear wheel steering angle control.

2. A rear wheel steering angle controlling device for vehicles according to claim 1, further comprising:
    a yaw rate detector for detecting a yaw rate of said vehicle;
    a lateral acceleration detector for detecting a lateral acceleration of said vehicle;
    a target yaw rate setting unit for determining a target yaw rate from said vehicle velocity and said lateral acceleration; and
    a feedback rear wheel steering angle control target value setting unit for determining a feedback rear wheel steering angle control target value according to a difference between a yaw rate detected by said yaw rate detector and said target yaw rate;
    wherein said rear wheel steering mechanism is controlled according to a rear wheel steering angle control target value obtained by adding said feedforward rear wheel steering angle control target value to said feedback rear wheel steering angle control target value.

3. The rear wheel steering angle controlling device for vehicles according to claim 1, further comprising:
    a fore-and-aft acceleration/deceleration detector for detecting a fore-and-aft acceleration/deceleration of said vehicle;
    wherein said rear wheel steering angle feedforward control target value setting unit changes said feedforward rear wheel steering angle control target value according to a change in a vehicle steer property caused by said fore-and-aft acceleration/deceleration of said vehicle.

4. A rear wheel steering angle controlling device for vehicles according to claim 1, wherein the configuration of said reference steering yaw rate transfer function property when the vehicle is traveling at a constant velocity to be identical to said steering yaw rate transfer function property without said rear wheel steering angle control includes modifying the steering yaw rate transfer function property without a rear wheel steering angle control in dependence on a change rate of the vehicle velocity.

5. A rear wheel steering angle controlling device for vehicles, comprising:
    a rear wheel steering mechanism for changing a rear wheel steering angle;
    a front wheel steering angle detector for detecting a front wheel steering angle;
    a vehicle velocity detector for detecting a vehicle velocity;
    a fore-and-aft acceleration/deceleration detector for detecting a fore-and-aft acceleration/deceleration of said vehicle, a steering yaw rate transfer function property without rear wheel steering angle control, and a prescribed reference steering yaw rate transfer function property;
    a feedforward rear wheel steering angle control target value setting unit for setting a feedforward control target value of said rear wheel steering angle according to said front wheel steering angle and said vehicle velocity; and
    a controlling device for controlling said rear wheel steering mechanism according to said feedforward rear wheel steering angle control target value;
    wherein said rear wheel steering angle feedforward control target value setting unit changes said feedforward rear wheel steering angle control target value by modifying a stability factor used for calculating said steering yaw rate transfer function property without rear wheel steering angle control according to a change in a vehicle steer property caused by said fore-and-aft acceleration/deceleration of said vehicle, and
    wherein said reference steering yaw rate transfer function property when the vehicle is traveling at a constant velocity is configured to be identical to said steering yaw rate transfer function property without said rear wheel steering angle control.

6. A rear wheel steering angle controlling device for vehicles according to claim 5, further comprising:
    a yaw rate detector for detecting a yaw rate of said vehicle;
    a lateral acceleration detector for detecting a lateral acceleration of said vehicle;
    a target yaw rate setting unit for determining a target yaw rate from said vehicle velocity and said lateral acceleration; and
    a feedback rear wheel steering angle control target value setting unit for determining a feedback rear wheel steering angle control target value according to a difference between a yaw rate detected by said yaw rate detector and said target yaw rate;
    wherein said rear wheel steering mechanism is controlled according to a rear wheel steering angle control target value obtained by adding said feedforward rear wheel steering angle control target value to said feedback rear wheel steering angle control target value.

* * * * *